United States Patent Office 3,269,500
Patented August 30, 1966

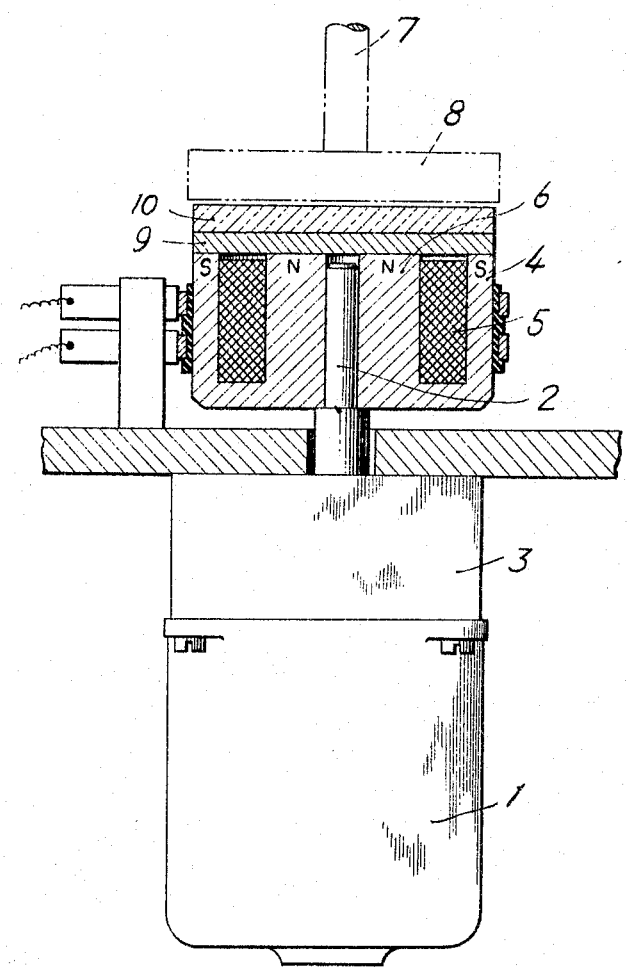

3,269,500
ELECTRO-MAGNETIC CLUTCH
Sizuo Imai, 323 2-chome, Sakasai, Edogawa-ku, Tokyo, Japan, and Kaoru Yunokuchi, 10 Kobuke-cho, Chiba, Japan
Filed Apr. 27, 1964, Ser. No. 362,896
Claims priority, application Japan, Sept. 20, 1963, 38/49,515
1 Claim. (Cl. 192—84)

The present invention relates to an electro-magnetic clutch apparatus wherein the influence of residual magnetism can be extinguished and so clutch engagement can be rapidly released when the exciting current is cut off from the magnet winding, which clutch apparatus is characterized in that, between the clutch magnet, and its cooperating armature plate, there are mounted in superposed relation one upon the other a magnetic short-circuiting layer or plate of magnetic material forming a magnetic short-circuit of limited permeance between the opposite polarity poles of the electro-magnet and mounted thereon above a magnetic insulating layer of non-magnetic material, so that the residual magnetism when exciting current is cut off from the electro-magnet will be short-circuited by the path through the magnetic short-circuiting layer.

One example embodiment of the present invention will be described with reference to the sole figure of the accompanying drawing:

Referring to the drawing, 1 denotes a prime mover such as an electric motor, 2 denotes a driving shaft driven by said motor 1 through a reduction gear 3. A clutch electro-magnet 6 comprising a core 4 and an exciting winding 5 wound thereon is fixed to the shaft 2 to rotate therewith, and in front of and in opposition to the same there is provided in spaced relation a clutch magnetic armature plate 8 attached to a driven shaft 7 and movable therewith, upon which magnetic armature plate the magnetic field from magnet 6 acts. Driven shaft 7 is supported by suitable lateral bearings. The core 4 of the electro-magnet 6 is so formed that its central portion is magnetized as a N pole and its outer circumferential portion is magnetized as a S pole, and in *front* of the pole faces and between the pole pieces of electro-magnet 6 and armature plate 8 there are provided in superposed engaging relation one upon the other a magnetic short-circuit layer plate 9 of thin magnetic material such as a silicon steel plate or the like forming a magnetic short-circuit between the N and S poles of electromagnet 6, and in front thereof, a magnetic insulating layer 10 of non-magnetic material.

The magnetic short-circuiting plate 9 is a relatively thin lamina of relatively small permeance and is mounted close to the pole pieces of clutch magnet 6, spaced by a small gap therefrom but acts as a magnetic short-circuit between the pole pieces. The non-magnetic layer 10 is mounted in contact with magnetic plate 9 and between magnetic plate or lamina 9 and clutch plate 8.

When, in this embodiment, the winding of clutch magnet 6 is excited, the magnetic flux between the N and S poles thereof partly flows through the magnetic short-circuit layer 9, but mostly leaks forward through the magnetic insulating layer 10 of non-magnetic material, so that owing to this leakage of magnetic flux there will be obtained magnetic engagement relation within the clutch plate 8 produced by the magnetic force. Clutch plate 8 will be pulled down against insulating layer 10 making functional engagement therewith. When, thereafter, the exciting current to electromagnet 6 is cut off, the small residual flux of the magnetic circuit flows through the short-circuiting magnetic plate 9 and then the magnetic flux which has been passing through magnetic clutch plate 8 is rapidly extinguished, and thus the magnetic flux is isolated by the non-magnetic layer 10 so as not to leak forwardly and reach magnetic clutch plate 8, so that the magnetic clutch engagement relation with the clutch plate 8 will be rapidly released and the tight frictional engagement between clutch plate 8 and magnetic insulating plate 10 will be released and the contact between adjacent plates 8 and 10 will be released and a short gap will be formed between plate 8 and plate 10 which will further increase the reluctance of the magnetic path through clutch plate 8. Thus, in the present apparatus, the influence on clutch plate 8 of the residual magnetism will be extinguished by the magnetic short-circuiting and magnetic insulating layers 9 and 10 and rapid release of the clutch engagement relation will be effected.

We claim:

In an electro-magnetic clutch, a driving member, a driven member, an electromagnet fixedly mounted on said driving member with its pole faces in a plane substantially perpendicular to the axis of said driving member, a relatively thin magnetic lamina of relatively small magnetic permeance mounted parallel to the plane of said pole faces and close thereto, a layer of magnetically insulating non-magnetic material mounted adjacent to said lamina, a magnetic armature clutch plate fixedly mounted on said driven member and parallel to said lamina and said layer of magnetic insulting material, and said layer of magnetic insulating material being mounted between said lamina and said clutch plate, whereby upon electric deenergization of said electromagnet, the magnetic coupling flux from said electromagnet to said armature clutch plate is immediately extinguished by the short-circuiting magnetic path through said lamina.

References Cited by the Examiner
UNITED STATES PATENTS 2,878,913   3/1959   Jaeschke _____ 192—21.5
2,886,149   5/1959   Baermann.

DAVID J. WILLIAMOWSKY, *Primary Examiner.*

DON A. WAITE, *Examiner.*

A. T. McKEON, *Assistant Examiner.*